United States Patent [19]
Welles

[11] Patent Number: 6,138,665
[45] Date of Patent: Oct. 31, 2000

[54] PORTABLE HEAT GENERATING DEVICE

[76] Inventor: Clifford G. Welles, P.O. Box 166, Pleasanton, Calif. 94566

[21] Appl. No.: 09/303,275

[22] Filed: Apr. 30, 1999

Related U.S. Application Data

[63] Continuation of application No. 08/763,603, Dec. 11, 1996, Pat. No. 5,901,698.

[51] Int. Cl.$^7$ ........................................ A61F 7/00
[52] U.S. Cl. ........................ 126/208; 126/204; 126/206; 431/268
[58] Field of Search .................................. 126/208, 204, 126/206; 431/268

[56] References Cited

U.S. PATENT DOCUMENTS

| | | | |
|---|---|---|---|
| 2,855,758 | 10/1958 | Johnson | 62/4 |
| 3,295,594 | 1/1967 | Hopper | 165/46 |
| 3,688,762 | 9/1972 | Chi et al. | 126/204 |
| 4,235,588 | 11/1980 | Tanaka | 431/147 |

*Primary Examiner*—Larry Jones

[57] ABSTRACT

A portable heat generating device in which fuel vapor (e.g. methanol) and an oxygen supply (e.g. air) are uniformly released through porous tubes woven with catalyst-impregnated glass filaments into a sheet-shaped, fabric-like structure enclosed in a mylar envelope. The catalyst promotes flameless combustion of the fuel vapor and oxygen, with consequent heat release occurring uniformly over the fabric-like structure. The heat generation process is started by pumping liquid fuel and air into the porous tubes using a peristaltic pump, thereby building up hydraulic pressure within the liquid fuel portion of the microbore-tubes. The level of pressure sustained within the liquid fuel portion of the microbore-tubes is limited by a manually set variable pressure release valve. The pressure in the microbore-tubes forces the liquid fuel within the porous microbore-tubing through the pores where it is converted into a vapor state before reacting with the oxygen and catalyst to produce flameless combustion. An exhaust tube expels the by-products of flameless combustion (i.e., mainly CO2 and H2O) from the enclosing envelope directly to the ambient atmosphere. As these gases escape from the envelope, a one-way check valve opens to refresh the air supply delivered to the air-carrying microbore-tubes to sustain the heat generating reaction without requiring continuous operation of the pump.

37 Claims, 3 Drawing Sheets

PORTABLE HEAT GENERATING DEVICE

This applications is a continuation of application U.S. Ser. No. 08/763,603, filed on Dec. 11, 1996 and now issued as U.S. Pat. No. 5,901,698 May 11, 1999.

BACKGROUND OF THE INVENTION

1. Field of the Invention

The present invention generally relates to a portable device for regulated production of heat, and more particularly to a portable heat generating device in which heat is uniformly generated across the surface of a sheet-shaped, fabric-like structure.

2. Description of the Prior Art

Several portable chemical heat generating devices are known which are incorporated into, for example, outerwear, garments, blankets and sleeping bags.

A first type of device is taught in U.S. Pat. No. 4,516,564 and U.S. Pat. No. 4,756,299. This first type of device includes a powdered, exothermic material, such as oxidizable metal, which is maintained in a sheet-like form and covered with a porous, air permeable sheet. The amount of air permeating the sheet is regulated to control the reaction rate of the exothermic materials, thereby controlling the amount of generated heat.

A second device is taught in U.S. Pat. No. 5,425,975. In this second device, exothermic material is dispersed in and supported by a sheet-like substrate made up of a plurality of irregularly arranged fibers having a multiplicity of gaps therebetween which facilitate air flow to the exothermic material. The sheet-like substrate is held in a bag having air-permeation holes. As with the first type of device, the amount of air entering the sheet-like substrate passing through the gaps is controlled such that the exothermic material generates a desired amount of heat.

A third device is taught in U.S. Pat. No. 5,125,392. In this device, exothermic material is held within a multitude of holes formed in a thermogenic material mat located between a pair of panels. Air is supplied to the exothermic material by a pump through a first plurality of air passages, and exhaust gases exit though a second plurality of air passages. The amount of heat generated by the exothermic material is controlled by controlling the air flow through the pump.

A problem associated with the above-mentioned first, second and third known device types is that the exothermic material is depleted after a period of use, thereby terminating the heat generating process. When the exothermic material is depleted, it is necessary to either dispose of some or all of the heating device, or to perform a cumbersome and time consuming process of replacing or regenerating the exothermic material. These characteristics make such devices impractical for multi-day travel on foot in isolated geographic locations where weight, convenience and refuse considerations are important.

Another problem associated with the above-mentioned first and second device types is that heat production is turned on and off relatively slowly because it is regulated by means of natural diffusion of air through permeable membranes of large surface area. Further, if these devices are used for warming parts of the body other than the extremities, turning these devices off requires physical removal of the devices from the body and storage in an air tight compartment. Because these heating devices are usually worn under a passive outer garment in these instances, they are not well suited for heat-on-demand applications where it is impractical or inconvenient to remove the outer layers of clothing.

Still other important factors reduce the usefulness of the above-mentioned prior art portable heat generating devices. For instance, the use of oxidizable powdered metals for generating heat at ambient temperatures will generally require a controlled and continuous supply of air (i.e. oxidizer) to produce and regulate heat output. The continuous flow is necessary to sustain a high reaction rate sufficient to generate adequate heat. Additionally, the rate of air flow must be sufficient to avoid non-uniform distribution of heat, as described in U.S. Pat. No. 5,125,392, mentioned above. Thus, significant energy must be expended to drive an air pump in a constant and dependable manner.

A fourth portable heat generating device is taught in U.S. Pat. No. 4,685,442. This portable heating device generates heat in a heat exchanger with is mounted at a location remote from the desired point of application of the heat. A circulating heat transfer fluid is pumped through the heat exchanger and then delivered to a desired point to perform the warming function. However, because of heat loss from the heat transfer fluid while it travels to the desired point, the energy efficiency of this device is poor. Furthermore, the device is relatively heavy because, in addition to the fuel required to provide the heat energy, the heat transfer liquid is required to transport the heat to the desired point. Another shortcoming of the fourth device is that the extra bulk and structural rigidity associated with a heat exchanger can reduce wearing comfort when worn for long periods. These and other limitations associated with the chemical heat generating devices, of which representative examples are described above, appreciably reduce their marketability for use in, for example, outerwear, garments, blankets and sleeping bags.

SUMMARY OF THE INVENTION

The present invention is directed to a portable heat generating device in which fuel vapor (e.g. methanol) and an oxygen supply (e.g. air) are uniformly released throughout a sheet-shaped, fabric-like structure. A catalyst is provided to promote flameless combustion of the fuel vapor and oxygen, with consequent heat release occurring uniformly over the fabric-like structure. By employing fuel vapor and a catalyst, the necessity for regenerating or disposing of powdered exothermic material is eliminated. Further, by directing the heat generating material (fuel vapor) to desired heating locations, the need for circulating a heat transfer fluid is also eliminated.

In one embodiment of the present invention, the fabric-like structure is constructed of catalyst-impregnated glass yarn woven around porous microbore-tubes using a standard hand loom and is contained within a sealed envelope. The catalytic material is platinum. A pump forces the liquid methanol through a first plurality of the tubes via a fuel inlet manifold, and the oxygen supply through a plurality of the tubes via an air inlet manifold. The microbore-tubes are arranged in parallel within the fabric-like structure such that every other microbore-tube carries liquid methanol, alternating with microbore-tubes carrying the oxygen supply. Fuel vapor and oxygen are uniformly released through the pores of the microbore-tubes in the presence of the platinum-coated glass fibers, thereby initiating flameless combustion which results in heat generation.

In operation, the heat generation process is started by first setting a flow direction of a peristaltic pump by sliding a button on the pump housing to the "on" position. This ensures that the flow of fuel and air through the pump is directed toward the inlet manifolds attached to the microbore-tubes. The pump is then stroked manually several times using a pull-tab. This transfers fuel and air into the porous microbore-tubes of the fabric-like structure, at the same time building up hydraulic pressure within the liquid fuel portion of the microbore-tubes. The level of pressure sustained within the liquid fuel portion of the microbore-tubes is limited by a manually set variable pressure release valve (VPV). The pressure in the microbore-tubes forces the liquid fuel within the porous microbore-tubing through the pores where it is converted into a vapor state. The rate of fuel vapor production increases as the pressure setting on the VPV is increased. This is the primary mechanism for controlling the rate of heat generation within the device. In addition to using hydraulic pressure as a rate regulating mechanism for heat generation, the bounding limits for lower and upper reaction rates can be selected by choosing specific component characteristics, such as, average microbore-tube pore diameter, microbore-tube wall thickness, total porous tube surface area and catalytic surface area.

An exhaust tube expels the by-products of flameless combustion (i.e., mainly $CO_2$ and $H_2O$) from the enclosing envelope directly to the ambient atmosphere. As these gases escape from the envelope, a one-way check valve, which is connected to the ambient atmosphere at a point located between the pump and the air inlet manifold, opens to relieve the resulting differential pressure. In this manner, fresh air is delivered to the air-carrying microbore-tubes to sustain the heat generating reaction without requiring continuous operation of the pump. Therefore, the heat generating process is self-propagating and is driven by the increased pressure within the envelope caused by the warm exhaust gasses.

The heat generating process ceases when the pressure in the fuel line inhibits the production of fuel vapors. The cessation of heat generation will occur after a period of time (unless further pumping is provided), or may be rapidly induced by setting the button on the pump casing to an "off" position and stroking the pull-tab. By setting the button in the "off" position, the pump is configured to draw fuel out of the fuel inlet manifold, thereby reducing the hydraulic pressure in the fuel-carrying microbore-tubes.

BRIEF DESCRIPTION OF THE DRAWINGS

These and other features, aspects and advantages of the present invention will become better understood with regard to the following description, appended claims, and accompanying drawings, where:

DESCRIPTION OF THE PREFERRED EMBODIMENT

Figure 1:
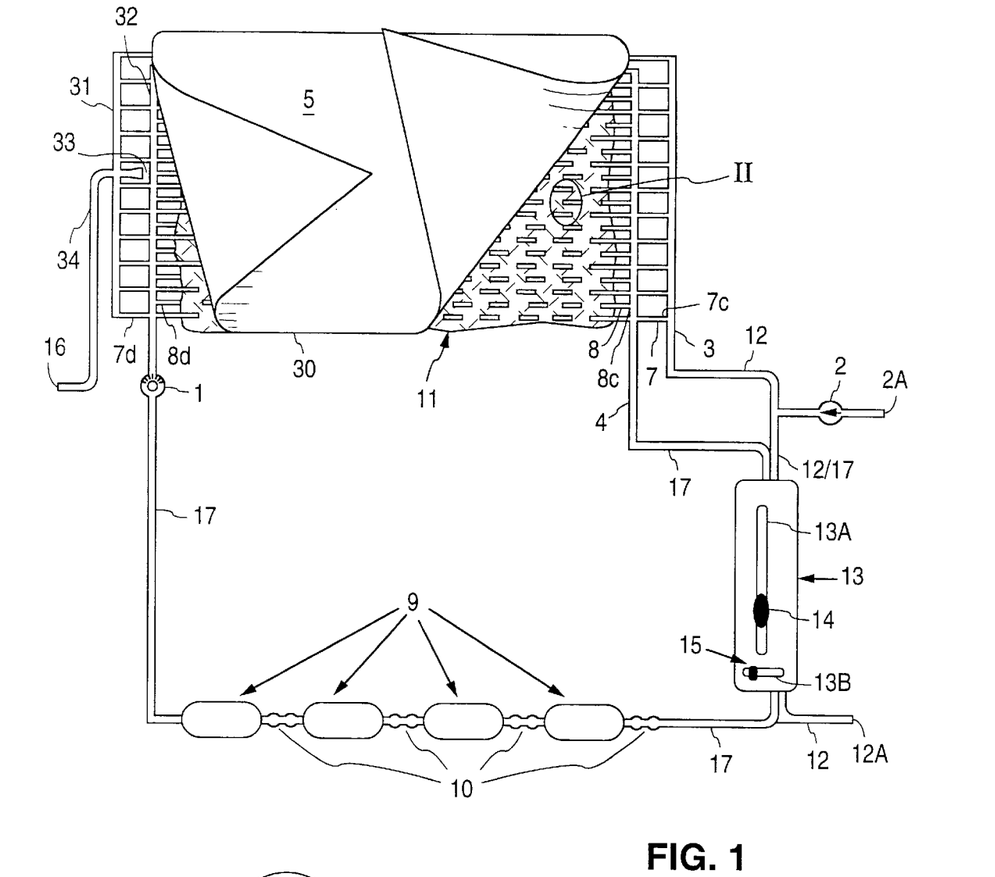
FIG. 1 is a partly cut-away plan view of a portable heat generating device constructed in accordance with the present invention.

FIG. 1 shows an embodiment of a portable heat generating device according to the present invention in which fuel is pumped from a segmented liquid fuel storage vessel 9 by a linear-profile peristaltic pump 13 to a woven (fabric-like) structure 5 where the fuel reacts with oxygen in the presence of a catalytic material to generate heat by flameless combustion.

The fabric-like structure 5 is constructed of glass filaments 11 forming the weft (crosswise) elements, and oxygen-carrying porous microbore-tubes 7 and fuel-carrying porous microbore-tubes 8 forming the warp (lengthwise) elements. As shown in FIG. 1, the microbore-tubes 7 and 8 extend from the glass filaments 11. An inlet end 7c of each microbore-tube 7 is connected to and communicates with an oxygen inlet manifold 3, and an outlet end 7d of each microbore-tube 7 is connected to and communicates with an oxygen outlet manifold 31. Similarly, an inlet end 8c of each microbore-tube 8 is connected to and communicates with a fuel inlet manifold 4, and an outlet end 8d of each microbore-tube 8 is connected to and communicates with a fuel outlet manifold 32. The fabric-like structure 5 and manifolds 3, 4, 31 and 32 are enclosed within a hermetically-sealed envelope 30 (which is cut-away in FIG. 1). The enclosed structure is suitable for incorporation into, for example, outwear, garments, blankets and sleeping bags.

Figure 2:
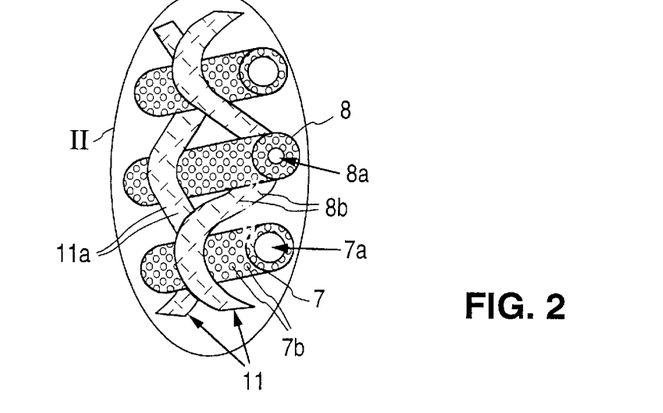
FIG. 2 is a cross section of the fiber-like structure shown in perspective.

As shown in FIG. 2, the glass filaments 11 are impregnated with a reaction-promoting catalyst material 11a. In accordance with one method, the glass filaments 11 are impregnated with a platinum catalyst by soaking the glass fibers in a chemical solution containing platinum agents that adhere to the fibers as they are pulled from the solution due to the wetting phenomenon (e.g. surface tension and adhesive forces combine to allow some liquid to adhere to the fiber). The fiber is then heated in a furnace at a temperature sufficient to activate the platinum. The impregnated fibers are then tested for activation properties by exposing the fibers (still in the furnace) to a reactable gas and measuring for increases in the furnace temperature.

The glass filament material used for the glass filaments 11 must be compatible with the coating and activation processes of the selected catalyst, must be free of any contaminants that might poison the catalyst and should be free of any over spray. A commercially-available glass filament which is suitable for use with a platinum catalyst is texturized fiber glass yarn sold by Owens-Corning under the product designation ETDE3.5. Materials other than fiber glass may also used for the weft elements, provided the selected material is either compatible with the selected catalyst, or that the catalyst is coated onto, for example, the microbore-tubes or an interior surface of the envelope 30.

As shown in FIG. 2, the air-carrying microbore-tubes 7 have a relatively large bore 7a and a plurality of pores 7b, and the fuel-carrying microbore-tubes 8 have a relatively small bore 8a and a plurality of pores 8b. The air-carrying tubes 7 and fuel-carrying tubes 8 are aligned in parallel and alternately arranged to achieve uniform distribution of fuel and air. One type of porous microbore-tubing which is suitable for use as the fuel-carrying tubes 8 and the air-carrying tubes 7 is high-density porous PTFE which can be custom-ordered from International Polymer Engineering of Tempe, Ariz. Suitable microbore-porous tubing has a nominal outer diameter of 0.75 to 2.0 mm, an inner diameter of 0.25 to 1.0 mm, and pores 7b and 8b passing between the inner bore and the outer surface having a nominal diameter of 0.1 to 10 microns. In one embodiment, the tubing used for the air-carrying tubes 7 uses a lower density PTFE, has a larger pore size and larger inside diameter than the fuel-carrying tubes 8. Materials other than PTFE may be used for the porous microbore-tubing, provided these materials are able withstand the heat generated by the flameless combustion reaction, described below, and are chemcially compatible with the fuel (e.g., methanol).

As shown in FIG. 2, the glass filaments 11 and microbore-tubes 7 and 8 are woven by any suitable technique such as a vertical hand loom. First, all of the tubes 7 and 8 are cut to substantially the same length and strung vertically in the hand loom such that they are parallel to each other. The air 7 and fuel 8 delivery tubes are alternately spaced. The exact number of microbore-tubes to be utilized is determined by a number of factors such as, air/fuel stoichiometry, rate of heat generation required, cost factors, as well as the necessity to provide sufficient structural integrity so that, when woven with the catalyst-impregnated glass filaments 11, the heat generating sheet is pliant but resistant to disassembly during routine use (i.e., the weft and warp elements maintain their spatial regularity and order, relative to each other, so that the function and form of the heat generating fabric is sustained after exposure to frequent twisting, torsion and tension normally experienced by a fabric used in a garment). As shown in FIG. 2, the catalyst-impregnated glass filaments 11 are then woven around the tubes 7 and 8 utilizing the hand loom.

After the weaving process is complete, the manifolds 3, 4, 31 and 32 are attached to the ends of the microbore-tubes 7 and 8 by the following process. First, the ends of the microbore-tubes projecting from the woven sheet are segregated according to whether they function as fuel-carrying tubes 8 or air-carrying tubes 7. The ends of the fuel-carrying tubes 8 are then respectively attached to a fuel-inlet manifold 4 and a fuel-outlet manifold 32 such that the hollow passage of each tube 8 communicates with an interior of the manifolds 4 and 32. The ends of the air-carrying tubes 7 are similarly respectively attached to an air-inlet manifold 3 and an air-outlet manifold 31. In one embodiment, the manifolds 3, 4, 31 and 32 are made of non-porous elastomeric material having an outer diameter in the range of 3 mm to 5 mm and an inner diameter in the range of 2 mm to 3 mm.

As shown in FIG. 1, each of the inlet manifolds 3 and 4 are attached to the peristaltic pump 13 by air (oxygen) inlet tube 12 and fuel line 17, respectively. In addition, the air inlet manifold 3 is connected to a post-pump air inlet 2A through a one-way check valve 2. The post-pump air inlet is exposed to the ambient atmosphere, and the one-way check valve opens to relieve pressure differentials within the envelope 30, as discussed below, thereby providing fresh air to sustain the heat generating reaction without requiring continuous operation of the peristaltic pump 13. The air outlet manifold 31 acts only as a termination point for the air conduits and does not direct the air to any other outlet. Instead, excess air exits the envelope 30 along with combustion by-products (H2O+CO2) through an exhaust tube (outlet) 34 which has a first end 33 located within the envelope 30, and an outlet end 16 which is located outside of the envelope 30. In contrast, the fuel outlet manifold 32 communicates with the fuel line 17 through a variable pressure relief valve (VPV) 1.

The hermetically-sealed envelope 30 completely encloses the woven sheet 5, the inlet manifolds 3 and 4, and the outlet manifolds 31 and 32. In the present embodiment, the envelope 30 is formed from an aluminized mylar sheet. The envelope 30 serves to confine the released fuel/oxygen mixture in close proximity to the platinum catalyst formed on the glass filaments 11, thereby ensuring a complete flameless combustion reaction. The reaction by-products (mainly H2O and CO2) are expelled from the envelope 30 through the exhaust tube 34 directly to the ambient atmosphere.

Referring to FIG. 1, the peristaltic pump 13 receives a portion of the fuel line 17 and air inlet tube 12. Fuel and air are pumped by manually actuating (sliding) the pull-tab 14 along a first slot 13A. The stroke of the pull-tab 14 is linear and is preferably less than 4 inches in order to minimize effort and support good human engineering design practices. The peristaltic pump 13 is adjustable through movement of a button 15 along a second slot 13B to either create a positive pressure in the inlet manifolds 3 and 4 (such that fuel and air are forced into the fabric-like structure 5, thereby initiating the heat generating process), or a negative pressure in the inlet manifolds 3 and 4 (such that the rate of combustion is reduced).

Figure 3:
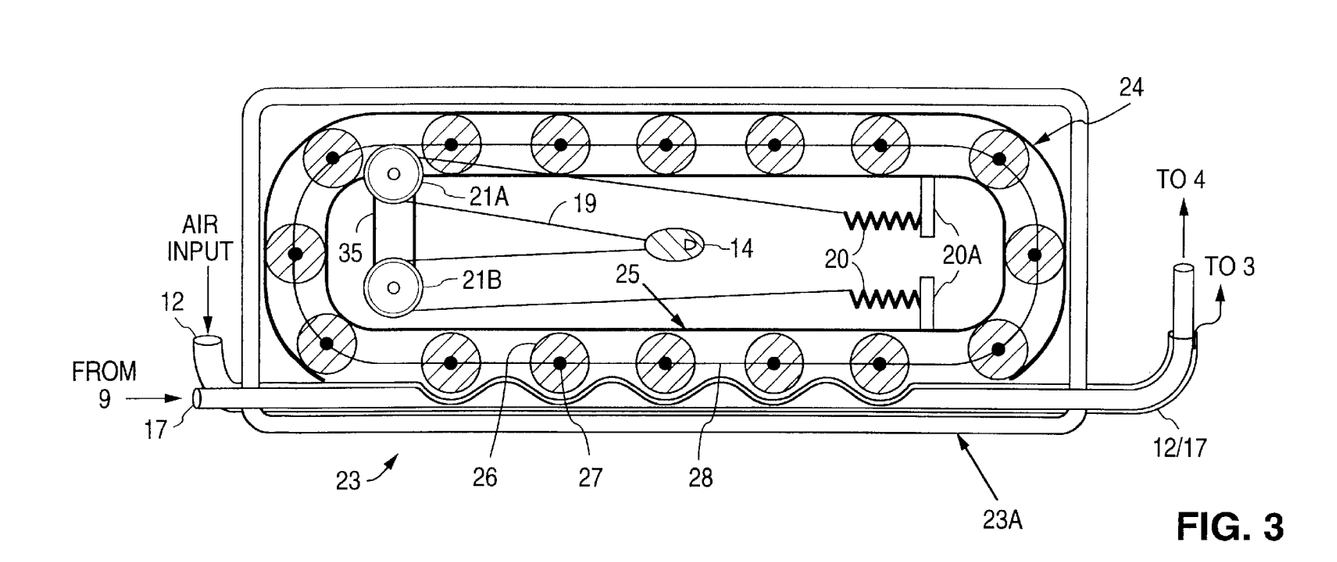
FIG. 3 is a plan view of the peristaltic pump with the cover removed.

FIG. 3 shows a plan view of the peristaltic pump 13 with a cover of the casing 23 removed to expose the pump's inner components. Portions of the fuel line 17 and air inlet tube 12 extend through the casing 23 along the inner surface of a lower wall 23A. A plurality of cylindrical rollers 26 are mounted on a continuous flexible thin metal band 28.

Figure 5:
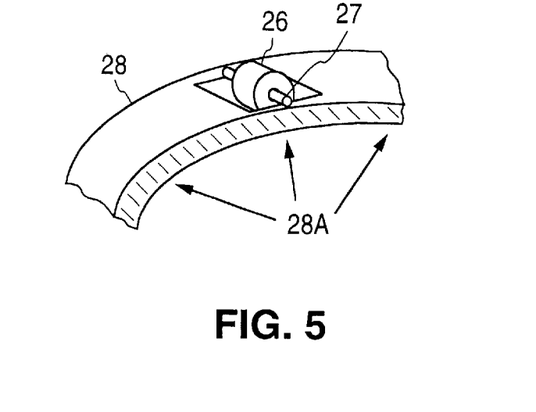
FIG. 5 is a perspective view of the metal roller band, roller pin and roller.

As shown in FIG. 5, the metal band 28 includes a splined portion 28A, and each of the rollers 26 is rotatably mounted onto a roller pin 27 which is fixed at both ends to the metal band 28.

Referring back to FIG. 3, the metal band 28 is mounted between an outer roller guide 24 and an inner roller guide 25 such that the rollers 26 are confined to travel along a substantially oval path. A portion of the outer roller guide 25 is removed adjacent the lower wall 23A such that a portion of the rollers 26 press portions of the fuel line 17 and air inlet tube 12 against the inner surface of the wall 23A. The rollers 26 are manually actuated to force fuel and air in a feeding direction (to the right in FIG. 3) along the fuel line 17 and air inlet tube 12 by a pair of toothed drive gears 21A and 21B.

Figure 4:
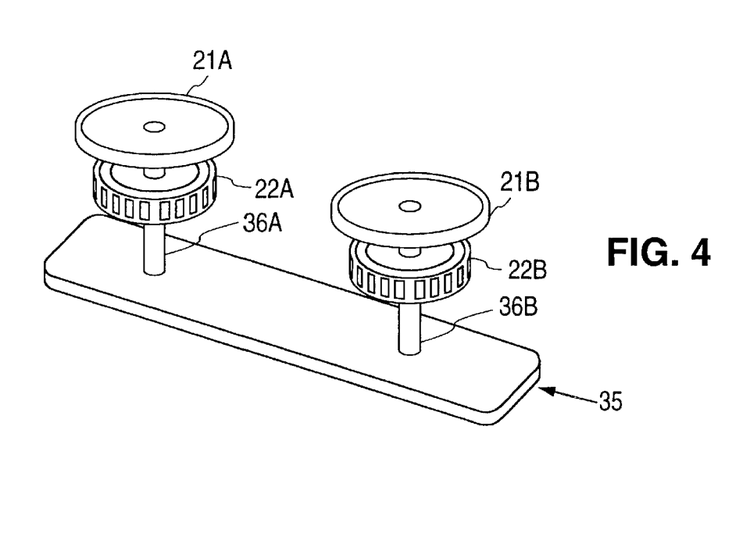
FIG. 4 is a perspective view of the gear drive mechanism within the peristaltic pump shown in FIG. 3.

As shown in FIG. 4, the drive gears 21A and 21B are fixed to the end of shafts 36A and 36B which are rotatably connected to a drive plate 35. A pair of ratchet gears 22A and 22B are respectively mounted on the shafts 36A and 36B between the drive gears 21A and 21B and the drive plate 35. The ratchet gears 22A and 22B include ratchet mechanisms which allow the gears to freely rotate relative to their respective shafts in one direction only, with ratchet gear 22A freely rotating only in a counter-clockwise direction and ratchet gear 22B freely rotating only in a clockwise direction.

Referring again to FIG. 3, the drive plate 35 is movably mounted within the casing 23 such that the teeth of the drive gear 21A mesh with the splined portion 28A of the metal belt 28 when the drive plate 35 is moved into a first position by the button 15 (shown in FIG. 1), and the teeth of drive gear 21B mesh with the splined portion 28A when the drive plate 35 is moved (downward in FIG. 3) into a second position by the button 15. The drive gears 21A and 21B are driven to rotate by manual actuation of the pull-tab 14, which is connected to a toothed belt 19. The toothed belt 19 is formed from an elastic material and is connected at its ends to a biasing spring 20 which is fixed to an anchor structure 20A, and is trained over the ratchet gears 22 and connected at a central portion to the pull-tab 14. When the pull-tab 14 is manually actuated (pulled to the right in FIG. 3), the toothed belt 19 causes the ratchet gears 22A and 22B to rotate their respective shafts 36A and 36b, thereby causing the drive gears 21A or 21B to drive the metal belt 28. When the pull-tab 14 is released, the spring 20 pulls the ends of the toothed belt 19 such that the ratchet gears 22A and 22B freely rotate on their respective shafts 36A and 36B. As a result, the pull-tab 14 is biased into its original position (to the left in FIG. 3) without causing corresponding reverse movement of the metal belt 28.

In the embodiment shown in FIG. 3, the fuel line 17 and air inlet tube 12 are integrated such that the conduit portion 12/17 passing through the casing 23 is coaxial in construction with the air inlet tube 12 formed around the fuel line 17. In other embodiments, the fuel line 17 and air inlet tube 12 may be separated.

Although the pumping action provided by the peristaltic pump 13 may be adequately accomplished by many other pumping techniques, the manually-operated peristaltic pump 13 is presently preferred because it provides a narrow, flat and very compact profile and is light weight, thereby allowing inconspicuous incorporation into garments or outerwear while allowing precise manual control of the pumping process. The pump is also designed so as to convert linear stroking motion into a smooth pumping action and allow quick reversal of the pump flow by sliding the button 15. As discussed above, the button 15 is connected to the plate 35 to provide adjustment of the pump 13 to quickly control the rate of heat generation.

Figure 6:
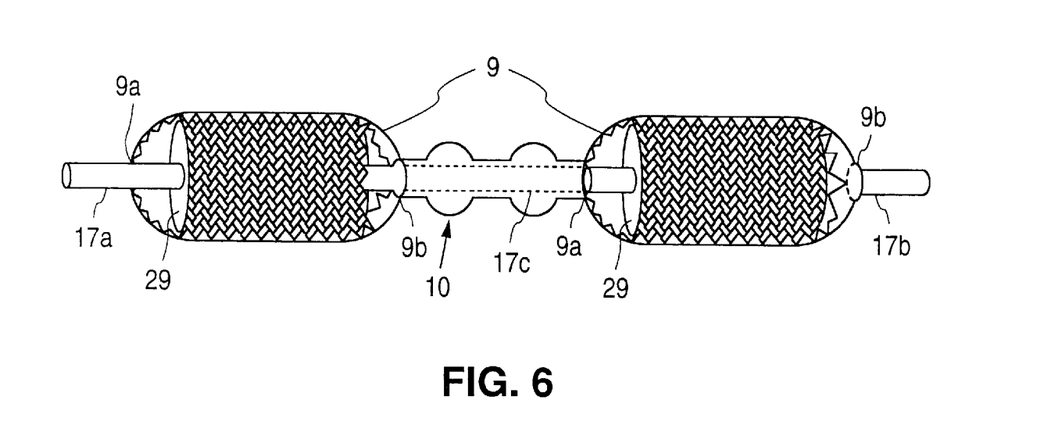
FIG. 6 is a cut-away view of the fuel storage capsules.

FIG. 6 is a partially cut-away view of the fuel storage capsules (fuel source) 9 which, in the present embodiment, are used to contain liquid methanol. A first portion of the fuel line 17 used to transport fuel from the fuel outlet manifold 32 to an inlet port 9a of the fuel storage capsules 9 is arbitrarily designated input portion 17a, and a second portion of the fuel line 17 used to transport fuel from an outlet port 9b of the fuel storage capsules 9 to the peristaltic pump 13 is designated as output portion 17b. As with the remainder of the fuel line 17 side, the input portion 17a and output portion 17b are constructed of elastomeric tubing.

The capsules 9 may be constructed of a sturdy rigid material such as aluminum to insure that the liquid methanol will be safely contained. In addition, third portions 17c of the fuel line 17 linking the capsules 9 are protected by flexible metal bellows 10 for the same purpose. Within each capsule is a porous sponge 29, the center of which is penetrated by the fuel line 17. The fuel line 17 is non-porous except for portions passing through the sponges 29. These portions of the fuel line are porous and are held in close contact with the inner walls of the sponges 29 by over-sizing the outside diameter of the fuel line 17 relative to the inside diameter of the bore holes of the sponges 29. This ensures that the pump 13 is able to pull liquid methanol from the capsules 9 regardless of orientation of the liquid methanol or the fuel level within the fuel storage capsules 9.

Operation of the portable heat generating device will now be described.

In an inactive (turned-off) condition, fuel pressure is maintained at a first level at which the fuel (e.g., liquid methanol) does not pass through the pores 7b of the fuel microbore-tubes 7. As a result, no heat generation takes place inside the envelope 30.

To initiate the heat generating process, the pull-tab 14 of the peristaltic pump 13 is manually stroked with the button 15 in the position shown in FIG. 1 (i.e., such that the toothed drive gear 21A is meshed with the splined portion 28A of the metal belt 28, as shown in FIG. 3). This stroking motion causes the rollers 26 to rotate in a feeding direction (e.g., counter-clockwise in FIG. 3), thereby drawing fuel from the capsules 9 and air through the inlet 12A of the air inlet tube 12, and forcing the fuel and air toward the inlet manifolds 3 and 4 (see FIG. 1). As air pressure in the air inlet manifold 3 increases, air is forced through the oxygen microbore-tubes 7 toward the air outlet manifold 31. Because the air outlet manifold 31 does not communicate with an outlet of the envelope 30, air is forced (released) through the pores 7b of the microbore-tubes 7. Further, because the pressure along the entire lengths of the microbore-tubes 7 is substantially equal, the air is released at a substantially uniform rate into the envelope 30. Similarly, as fuel pressure in the inlet manifold 4 increases, fuel is forced through the fuel microbore-tubes 8 toward the fuel outlet manifold 32. Back pressure applied by the VPV 1 creates sufficient pressure to force (release) fuel through the pores 8b of the microbore-tubes 8. The fuel vaporizes on the outside of the microbore-tubes 8, and mixes with the air released from the adjacent microbore-tubes 7. The fuel/air mixture then reacts in the presence of the platinum catalyst to generate heat by flameless combustion. As warm exhaust gases collect in the envelope 30, the resulting increased pressure forces these exhaust gases (mainly $H_2O$ and $CO_2$) through the exhaust tube 34 to the surrounding atmosphere.

Once the heat generating process is initiated, residual pressure in the fuel line 17 continues to force (release) fuel through the pores 8b of the fuel microbore-tubes 8. The heat generating process is self-propagating because the pressure build up of warm gases within the mylar envelope 30 causes new air to be supplied automatically through the one-way low pressure check valve 2, the inlet 2A of which is connected to the ambient cool air. The valve 2 opens in response to the drop in pressure within the envelope as the exhaust products leave.

Several strokes of the pull-tab 14 on the pump 13 is sufficient to build up adequate hydraulic pressure within the porous microbore-tubing 8 to initiate the heat generating process. The VPV 1 on the fuel outlet manifold 32 controls the maximum pressure of the fuel within the microbore-tubing 8, thereby providing a convenient mechanism for controlling the resulting temperature. That is, the maximum pressure value of the VPV 1 is set manually by the user to either increase or decrease the rate of heat generation.

The hydraulic pressure in the fuel-carrying tubes 8 begins to fall slowly after the stroking of the pull-tab 14 is completed because the volume within the porous microbore-tubing is continuously being reduced due to evaporation. No further pumping action is required until the rate of fuel evaporation drops sufficiently to cause noticeable reduction in heat generation. This may take from 5 minutes to 30 minutes or more depending on the ambient temperature, initial pressure setting on the VPV 1 and design criteria such as average pore diameter, tubing outside diameter, tubing bore size and other parameters selected in constructing the subject invention.

As mentioned above, the drive plate 35 is movable into two positions by manually sliding the pump direction button 15 to either the right or left ("on" or "off") position, as shown in FIG. 1. In the "on" position, shown in FIG. 3, the splined portion 28A of the metal roller band 28 and the roller 21A are engaged, thereby causing counter-clockwise circulation of the roller band when the pull-tab 14 is stroked. Conversely, when the gear drive plate 35 is moved downward by sliding the button 15 in the "off" position, the drive gear 21B engages the splined portion 28A of the metal band 28 (near the bottom in FIG. 3). In this "off" position, stroking of the pull-tab 14 causes the roller band to circulate in a clockwise direction, thereby removing liquid fuel from the microbore-tubing 8 such that the hydraulic pressure is reduced. This allows for a quick cessation of the heat generation process. In the "off" mode, the VPV 1 acts as a one-way check valve preventing the fuel in the fuel storage capsules from flowing into the microbore-tubing 8 through the outlet manifold 32.

While the preferred application of the present invention has been shown and described, it should be apparent to those skilled in the art that many more modifications are possible without departing from the invention concept herein described. For example, a gaseous fuel and air mixture may be stored in one or more pressurized cylinders (fuel sources) and transported (without pumping) to one or more sets set of porous tubes, thereby eliminating the need for a pump and, when the fuel/air mixture is stored in a single cylinder, eliminating the need for both oxygen-carrying tubes 7 and fuel-carrying tubes 8. In addition, the catalyst may be formed on a surface of the microbore porous tubes or another surface within the envelope 30, provided the surface is compatible with the catalyst. Further, a single microbore tube can be threaded throughout the sheet, either to transport a mixture of fuel and air, or to only carry fuel (with a separate microbore tube also threaded throughout the sheet for carrying air). Moreover, instead of weaving the microbore tubing to form the fabric-like structure 5, the microbore tubing can be attached to a sheet-like structure using, for example, an adhesive, and then molding a foamed, and therefore porous, thermosetting compound over the microbore tubing. Therefore, the appended claims are intended to encompass within their scope all such changes and modifications which fall within the true spirit and scope of this invention.

We claim:

1. A portable heat generating device, comprising:
    a fuel-carrying porous tube having an inlet and a plurality of pores;
    a catalyst located near the pores of the fuel-carrying porous tube;
    an envelope containing both the fuel-carrying porous tube and the catalyst, the envelope having an outlet;
    a fuel source coupled to the inlet of the fuel-carrying porous tube; and
    means for transporting fuel from the fuel source to the inlet of the fuel-carrying porous tube at a pressure such that the fuel is released through the pores and reacts with the catalyst to generate heat.

2. The portable heat generating device according to claim 1, wherein the means for transporting the fuel further comprises:
    a pump connected between the fuel source and the fuel-carrying porous tube; and
    a non-porous fuel line connecting the fuel source, the pump and the fuel carrying porous tube.

3. The portable heat generating device according to claim 2, wherein the means for transporting the fuel further comprising:
    a non-porous fuel line connected between the fuel source and the fuel-carrying porous tube; and
    the pump is a peristaltic pump comprising
        a casing receiving a portion of the fuel line,
        a plurality of rollers rotatably mounted on a belt which is movably mounted in the casing such that at least some of the rollers press against the portion of the fuel line,
        a drive gear engaged with the belt; and
        a manually-actuated mechanism for rotating the drive gear such that the plurality of rollers are driven by the belt to transport fuel to the fuel-carrying porous tube.

4. The portable heat generating device according to claim 2, wherein one or more fuel-carrying tubes further comprises:
    a fuel inlet manifold connected to the inlet of the fuel-carrying porous tube;
    a fuel outlet manifold connected to the outlet of the fuel-carrying porous tube;
    a non-porous fuel line connecting the fuel outlet manifold to the fuel source, connecting the fuel source to the pump, and connecting the pump to the fuel inlet manifold; and
    a check valve connected to the outlet manifold and the fuel line between the outlets of one or more of the fuel-carrying tubes and the fuel source, the check valve being adjustable to control a maximum hydraulic pressure within the fuel-carrying tube.

5. The portable heat generating device according to claim 4, wherein the fuel source further comprises:
    a capsule containing a sponge, an inlet port and an outlet port;
    wherein the fuel line extends through the capsule from the inlet port to the outlet port, a portion of the fuel line passing through a hole formed in the sponge; and
    wherein the portion of the fuel line extending through the sponge is porous.

6. The portable heat generating device according to claim 1, further comprising:
    one or more oxygen-carrying porous tubes having an inlet and a plurality of pores, the oxygen-carrying porous tube being connected to an oxygen source; and
    wherein the means for transporting transports the oxygen from the oxygen source to the inlet of the oxygen-carrying porous tube at a pressure such that the oxygen is released through the pores and mixes with the fuel.

7. The portable heat generating device according to claim 6, wherein the means for transporting comprises a pump connected to a fuel line extending from the fuel source and the fuel-carrying porous tube, and connected to an oxygen inlet tube extending from the oxygen supply to the oxygen-carrying porous tube.

8. The portable heat generating device according to claim 7, wherein the means for transporting further comprises:
    wherein a portion of the fuel line passes through the pump;
    wherein a portion of the oxygen inlet tube passes through the pump; and
    wherein the portion of the fuel line passing through the pump and the portion of the oxygen tube are integrally formed such that the portion of the oxygen inlet tube is formed around the portion of the fuel line.

9. The portable heat generating device according to claim 8, further comprising:
    an oxygen inlet manifold connected to the inlets of one or more oxygen-carrying porous tubes;
    an oxygen inlet tube having an inlet portion connected to the pump, and a second portion connecting the oxygen source and the oxygen inlet tube between the pump and the oxygen inlet manifold; and
    a one-way check valve between the second portion of the oxygen inlet tube between the pump and the inlet of the oxygen-carrying tube.

10. A portable heat generating device comprising:
    a fabric-like structure including one or more filaments woven around one or more parallel fuel-carrying tubes, each of the fuel-carrying tubes having an inlet and a plurality of pores;

an envelope enclosing the fabric-like structure, the envelope having an outlet; and means for transporting fluid fuel to each of the fuel-carrying tubes such that the fluid fuel enters each inlet and is released through the pores;

wherein at least some of the filaments includes a catalyst material for reacting with the fuel released through the pores of the fuel-carrying tubes to generate heat by flameless combustion.

11. The portable heat generating device according to claim 10, wherein the fabric-like structure further comprises one or more oxygen-carrying tubes having an inlet and a plurality of pores, each of the oxygen-carrying tubes being parallel with the fuel-carrying tubes and alternately arranged.

12. The portable heat generating device according to claim 11, wherein each of the fuel-carrying tubes includes an outlet, the device further comprising:

an air inlet manifold connected to the inlet of each of the oxygen-carrying tubes;

a fuel inlet manifold connected to the inlet of each of the fuel-carrying tubes; and a fuel outlet manifold connected to the outlet of each of the fuel-carrying tubes;

a fuel line connected to the fuel outlet manifold;

a check valve connected to the fuel line connected to the fuel outlet manifold, the check valve being adjustable to control a maximum hydraulic pressure within the fuel-carrying tubes; and wherein the air inlet manifold, the fuel inlet manifold and the fuel outlet manifold are enclosed within the envelope.

13. The portable heat generating device according to claim 12, further comprising:

an oxygen inlet tube connected to the oxygen inlet manifold; and a one-way check valve connected to the oxygen inlet tube.

14. The portable heat generating device according to claim 10, wherein the filaments comprise a fiber impregnated with a catalyst material on its surface.

15. A method for generating heat in a portable heat generating device, the method comprising the steps of:

transporting fuel into one or more fuel-carrying porous tubes;

directing at least some of the fuel through pores of the fuel-carrying porous tubes onto a catalyst material; and reacting the fuel with the catalyst to generate heat by flameless combustion.

16. The method according to claim 15, further comprising the steps of:

transporting oxygen into one or more oxygen-carrying porous tubes adjacent to one or more fuel-carrying porous tubes; and passing some of the oxygen through the pores in each of the oxygen-carrying porous tubes such that the oxygen mixes with the fuel before reacting with the catalyst material.

17. The method according to claim 16, wherein the steps of transporting fuel and transporting oxygen further comprises pumping liquid fuel and air using a pump.

18. The method according to claim 15, wherein the step of transporting fuel further comprises:

pumping liquid methanol into one or more fuel-carrying porous tubes;

releasing some of the liquid methanol through the pores such that the liquid methanol vaporizes; and reacting the vaporized methanol with the catalyst.

19. A portable heat generating device, comprising:

a fuel source;

a fuel-carrying porous tube having an inlet, an outlet and a plurality of pores connected to the fuel source;

a catalyst located near the pores of the fuel-carrying porous tube;

an oxygen source;

an oxygen-carrying porous tube having an inlet, an outlet and a plurality of pores;

an envelope containing both the fuel-carrying porous tube, the oxygen-carrying porous tube and the catalyst, the envelope having an inlet and an outlet; and a means for transporting fuel to the inlet of the fuel-carrying porous tubes at a pressure such that the fuel is released through the pores, and oxygen, from the oxygen source to the inlet of the oxygen-carrying porous tube such that oxygen is released through the pores, allowing the fuel to react with the catalyst to generate heat.

20. A portable heat generating device, comprising:

a fuel source contained within a fuel storage vessel with an inlet and an outlet;

a fuel-carrying porous tube having an inlet, an outlet and a plurality of pores;

a reaction promoting catalyst located adjacent to the pores of the fuel-carrying porous tube;

an oxygen source;

an oxygen-carrying porous tube having an inlet, an outlet and a plurality of pores;

an envelope containing both the fuel-carrying porous tube, the oxygen-carrying porous tube and the catalyst, the envelope having an inlet and an outlet; and a means for transporting fuel, from the fuel storage vessel to the inlet of the fuel-carrying porous tube at a pressure such that the fuel is released through the pores, and oxygen, from the oxygen source to the inlet of the oxygen-carrying porous tube such that oxygen is released through the pores, allowing the fuel to react with the reaction promoting catalyst to generate heat.

21. The portable heat generating device according to claim 20, wherein the reaction promoting catalyst comprises:

a catalyst selected from the group of platinum, palladium, rhodium and rare earth group.

22. The portable heat generating device according to claim 20, wherein the means for transporting the fuel comprises:

a non-porous fuel line connecting the fuel storage vessel and the fuel-carrying porous tube;

a non-porous oxygen line connecting the oxygen source to the oxygen-carrying porous tube; and a pump connected between the fuel storage vessel and the fuel-carrying porous tube and the oxygen source and the oxygen-carrying porous tube.

23. The portable heat generating device according to claim 22, wherein the pump connected between the fuel source and the fuel-carrying porous tubes comprises:

a casing enclosing the pump and holding a portion of the non-porous fuel line and the non-porous oxygen line;

a plurality of rollers rotatably mounted on a belt within in the casing, such that at least some of the rollers press against the portion of the fuel line and the oxygen line in the casing;

a drive gear engaged with the belt; and a manually actuated mechanism for rotating the drive gear such that the plurality of rollers are driven by the belt to transport fluid along the portion of the fuel line toward the fuel-carrying porous tube.

24. The portable heat generating device according to claim 22, wherein the pump connected between the fuel source and the fuel-carrying porous tubes comprises:

an electrically driven peristaltic pump.

25. The portable heat generating device according to claim 22, wherein the fuel storage vessel further comprises:

a capsule with an inlet port and an outlet port;

a sponge with a passage within the capsule; and a fuel line passing through the inlet of the capsule to the outlet of the capsule and passing through the sponge, where a portion of the fuel line passing through the sponge is porous.

26. The portable heat generating device according to claim 31, wherein the fuel storage vessel further comprises:

one or more capsules connected to the fuel line;

a flexible linkage between the capsules.

27. The portable heat generating device according to claim 22, the non-porous fuel line connecting the fuel storage vessel and the fuel-carrying porous tube and the non-porous oxygen line connecting the oxygen source to the oxygen-carrying porous tube wherein a portion of the fuel line passes through the pump; further comprising:

a portion of the non-porous fuel line and a portion of the non-porous oxygen line being integrally formed, such that the portion of the oxygen inlet tube is formed around the portion of the fuel line.

28. The portable heat generating device according to claim 22, a non-porous oxygen line connecting the oxygen source to the oxygen-carrying porous tube, further comprising:

an oxygen inlet tube having one end connected between the pump and the oxygen-carrying porous tube, and the other end connected to the oxygen source; and a one-way check valve within the oxygen inlet tube, allow a flow of oxygen in the direction from the oxygen source to the non-porous oxygen line.

29. The portable heat generating device according to claim 20, wherein the envelope containing both the fuel-carrying porous tube, the oxygen-carrying porous tube and the catalyst, further comprises:

a cover material to hermetically seal the envelope;

a sheet shaped structure within the envelope containing a plurality of fuel-carrying porous tubes, a plurality of oxygen-carrying porous tubes and the catalyst;

a non-porous fuel inlet manifold, such that the inlet ends of the fuel-carrying porous tubes are attached to the fuel inlet manifold, such that the hollow passage of each fuel-carrying porous tube communicates with the interior of the fuel inlet manifold;

a non-porous fuel outlet manifold, such that the outlet ends of the fuel-carrying porous tubes are attached to the fuel outlet manifold, such that the hollow passage of each fuel-carrying porous tube communicates with the interior of the fuel outlet manifold;

a non-porous fuel line connecting the fuel outlet manifold to the inlet of the fuel storage vessel;

a non-porous oxygen inlet manifold, such that the inlet ends of the oxygen-carrying porous tubes are attached to the oxygen inlet manifold, such that the hollow passage of each oxygen-carrying porous tube communicates with the interior of the oxygen inlet manifold;

a non-porous oxygen outlet manifold, such that the outlet ends of the oxygen-carrying porous tubes are attached to the oxygen outlet manifold, such that the hollow passage of each oxygen-carrying porous tube communicates with the interior of the oxygen outlet manifold; and a combustion gas exhaust tube connected with the oxygen outlet manifold.

30. The portable heat generating device according to claim 29, wherein the sheet shaped structure within the envelope, further comprises:

one or more fibers coated with the catalyst; and a fabric-like material formed by the fibers being interwoven through one or more of the fuel-carrying porous tubes and one or more of the oxygen-carrying porous tubes.

31. The portable heat generating device of claim 30, the fabric-like material further comprising:

one or more oxygen-carrying tubes being parallel with one or more fuel-carrying tubes and alternately arranged such that one fuel-carrying tube is located between two oxygen-carrying tubes.

32. The portable heat generating device of claim 30, where in the fiber coated with the reaction promoting catalyst, further comprises:

glass fiber.

33. The portable heat generating device according to claim 29, wherein the cover material to hermetically seal the envelope further comprises:

a metalized polymer sheet.

34. The portable heat generating device according to claim 29, wherein the a non-porous fuel line connecting the fuel outlet manifold to the inlet of the fuel storage vessel further comprises:

a check valve connected between the fuel outlet manifold and the inlet of the fuel storage vessel, the check valve located outside of the envelope, being adjustable to control a maximum hydraulic pressure within the fuel-carrying porous tubes.

35. A method for generating heat in a portable heat generating device, the method comprising the steps of:

transporting a fuel into one or more fuel-carrying porous tubes;

directing at least some of the fuel through pores formed in each of the fuel-carrying porous tubes onto a catalyst;

transporting oxygen to into one or more oxygen-carrying porous tubes;

directing oxygen through the pores formed in each of the oxygen-carrying porous tubes, thereby providing oxygen to the fuel on the catalyst; and allowing the fuel to react with the catalyst in such a manner as to generate heat by flameless combustion.

36. The method according to claim 35, wherein the steps of transporting fuel and transporting oxygen further comprises:

pumping liquid fuel and air using a peristaltic pump.

37. The method according to claim 35, wherein the step of transporting fuel comprises:

pumping a liquid fuel into the plurality of fuel-carrying porous tubes;

releasing some of the liquid fuel through pores in the fuel-carrying porous tubes as a vapor before reacting the fuel with the catalyst; and allowing the vapor to react with the catalyst to generate heat through flameless combustion.

* * * * *